United States Patent Office

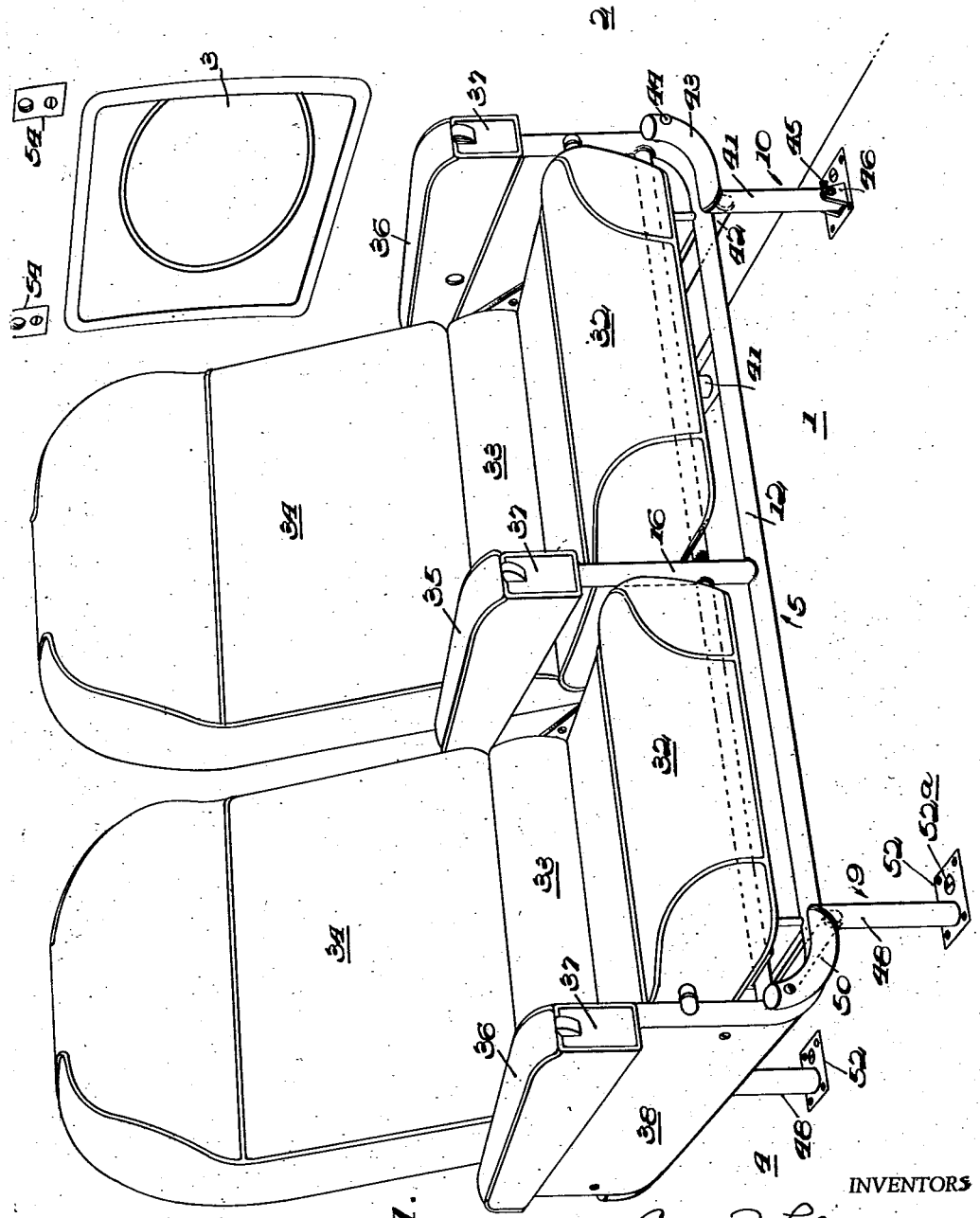

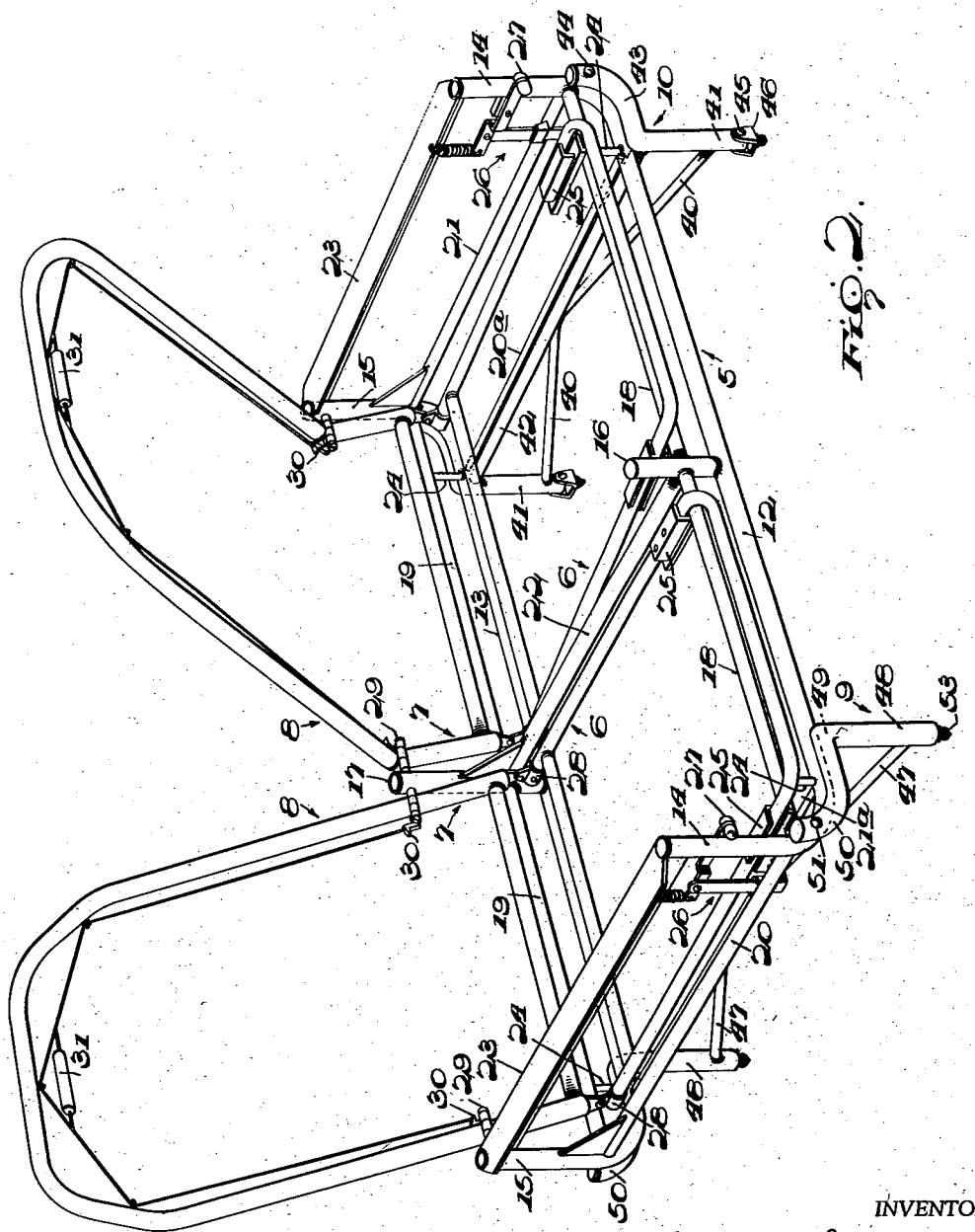

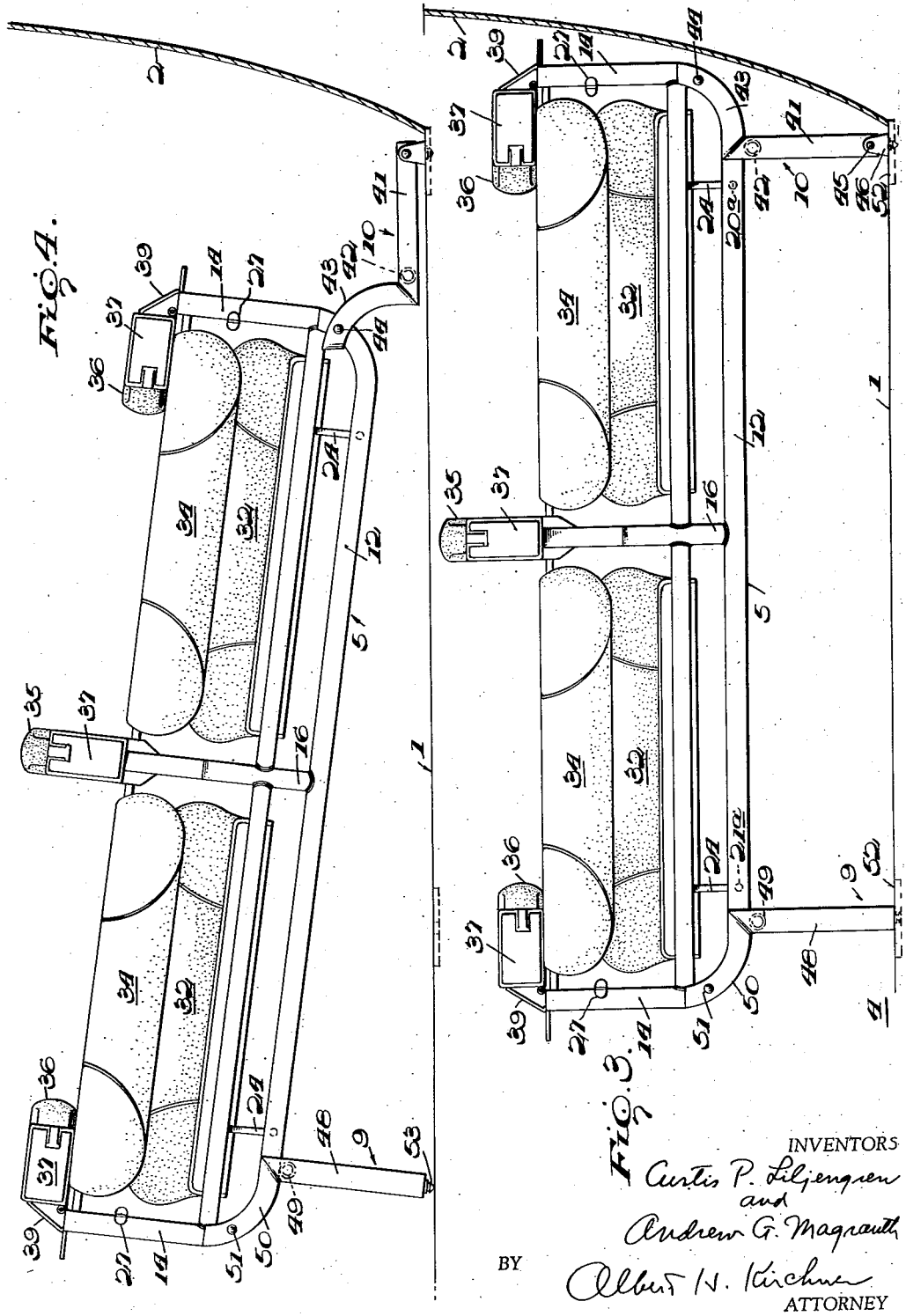

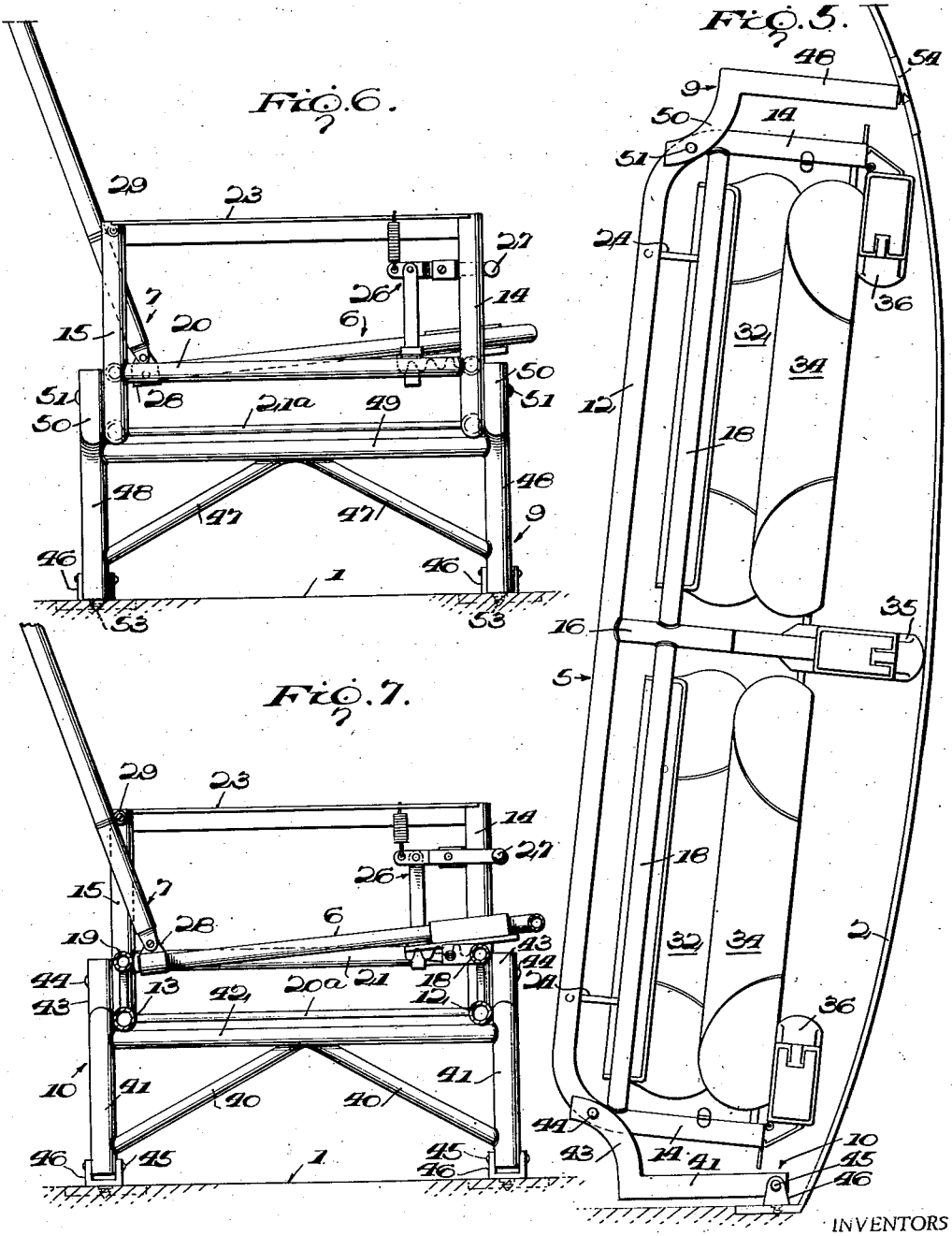

2,799,321
Patented July 16, 1957

2,799,321

FOLDING SEAT CONSTRUCTION FOR VEHICLES

Curtis P. Liljengren, Miami, Fla., and Andrew G. Magrauth, Glenbrook, Conn., assignors to Flight Equipment and Engineering Corp., Miami, Fla., a corporation of Florida Application November 6, 1950, Serial No. 194,216

9 Claims. (Cl. 155—5)

The present invention relates to seats per se and to seat mountings and seating arrangements especially adapted to be used in vehicle interiors, which may, by way of example but not limitation, be the cabins of airplanes where it is desirable to convert the vehicle from passenger to freight service by disposing the seats selectively in operative or stowed position.

An important feature of the invention is the provision of a strong, lightweight, practical seat construction which will in one position comfortably and safely accommodate a passenger and which can be readily folded compactly into small compass and stowed securely against a side wall of the vehicle.

The structure disclosed and claimed in this application is related to and constitutes an improvement over the constructions which form the subject of U. S. Patent No. 2,523,960 issued September 26, 1950, to the assignee of the present application on the joint invention of one of the present applicants and Eugene R. McGregor, and of application Serial No. 47,486, filed September 2, 1948, now Patent No. 2,674,300, by the same one of the present applicants and Eugene R. McGregor, assigned to the present assignee.

While the structure proposed by the invention is capable of being installed to advantage in vehicles generally, or even in fixed buildings, the preferred embodiment which has been selected to illustrate the invention was designed especially for airplane use and has certain advantages in such use and it will be convenient therefore to explain the inventive principles in terms of such embodiment and use. But such explanation is not to be considered as limiting the application of the principles, or the scope of the invention, to the particular details, purposes or uses herein described. Reference is made to the appended claims for definitions of the broad scope of the invention.

A general object of the invention, in the embodiment intended for airplane and analogous service, is to provide a foldable seat structure with cargo hold down means or fittings which will be exposed in operative position when the seat is stowed and which will afford secure and stable anchorage fixtures for affixing ropes, straps and the like which are required to be tied to and over the lading to prevent its shifting.

Another object is to make the seat foldable to a form or condition in which its upholstered surfaces will be well protected from contact with the enclosing structure of the vehicle or the like, such as the airplane cabin side wall, and from contact with cargo which may be crowded between the stowed seats.

A related object is to provide a seat which, when stowed in folded condition, will effectively protect the side wall, or other surface against which it is stowed, from damage that might result from contact by the cargo.

A further object is to incorporate all the foregoing and other advantages and features in a structure which may be mounted interchangeably on either side of a vehicle, with the two sides of the structure disposable equally well at the aisle or side wall, so that the making of special rights and lefts is avoided, and so that a single style of replacement structure can be substituted anywhere in an installation.

A general object of the invention is to make the structure simple and foolproof so that it can be operated rapidly by unskilled persons and will include relatively few parts all of which can be made rugged for a long life of satisfactory use.

Other objects are concerned with improving the structures shown in the previously filed applications by simplifying the construction through elimination of some of the mechanical elements; by improving the appearance of the seat when in operative position by making it symmetrical at its outboard and inboard sides, particularly in respect of the leg structure at the two sides; by disposing the seat in a considerably lowered stowed position so as to provide greater protection to the lower portion of the vehicle side wall and greater clearance of the top of the folded seat under baggage racks and the like; by dispensing with the need for attaching fittings to the lower portion of the vehicle side wall, so that the seat when in operative position is unconnected to the side wall; and by making the inboard and outboard legs identical and hence interchangeable.

In the accompanying drawings, which form part of this application for Letters Patent and which show a preferred embodiment of the invention, Figure 1 is a perspective view of a twin seat unit disposed in extended operative position in the cabin of an aircraft;

Fig. 2 is a perspective view of the framework structure, showing the preliminary step of folding prior to swinging the folded seat to stowed position;

Fig. 3 is a front elevational view of the folded seat ready to be swung to stowed position;

Fig. 4 is a front elevational view showing the folded seat in position following the first stage of its swinging movement to stowed position;

Fig. 5 is a front elevational view showing the seat in stowed position;

Fig. 6 is a side elevational view of the framework structure, taken from the inboard side; and Fig. 7 is a vertical cross sectional view of the framework structure, looking toward the outboard side of the seat and showing the outboard leg in elevation.

Generally speaking, the invention, as incorporated in the preferred embodiment shown in the drawings, comprises a seat base frame, which may be designed for single, double or even triple occupancy, having a back adapted to be folded down thereon and having legs of identical or similar construction and appearance mounting the base at its inboard and outboard sides, with each leg connected to the floor only, and with no connection of either leg or any other part of the seat to the vehicle side wall, both legs being pivotally or hingedly connected to the base frame to provide for swinging the frame, with the back in downfolded position, from horizontal, operative or occupant-supporting position closely adjacent to the side wall, to upright or substantially vertical stowed position close to the side wall and with the outboard side of the seat close to the floor. This swinging is effected by a compound pivoting movement in which the outboard side of the seat becomes first lowered to or very nearly to the floor at a distance somewhat increased from the original spacing of that side from the side wall, followed by upwardly swinging the inboard side of the seat to disposed the folded seat in substantially vertical position close to the side wall and with the outboard side located very close to the floor. The arrangement is such that the seat is supported with great stability in both its horizontal and vertical positions.

In the drawings, the reference numeral 1 designates the floor of the cabin of an airplane having a side wall 2 which may be provided with windows 3 and having an aisle area 4. The seat construction to which the present invention is applied is disposed in operative, occupant-supporting position on the floor between the aisle and side wall and in such operative position is mounted on the floor exclusively, without connection to the side wall, for folding to inoperative, stowed position in which it stands upright against and is securely connected to the side wall, as will be evident from a comparison of Figs. 1 and 2 with Fig. 5.

While the details of the seat itself, comprising the combination of a base, a back and armrests, form no part of the present invention, a particular embodiment of such structure, which is shown and claimed in application Ser. No. 47,486 hereinabove identified, is preferred for use with the present invention, which relates to the seat mounting and to the arrangement for effecting its swinging movement between operative and stowed positions, and will now be briefly described.

This preferred form of seat construction comprises a framework including principally a main base frame 5, a seat bottom frame 6 (shown double, as a pair of frames, one for each of the two halves of a double seat), which is slidable fore and aft or longitudinally on the frame 5, a lower seat back frame 7, which is pivoted at its bottom to the seat bottom frame and at its top to upstanding parts of the main base frame, an upper seat back frame 8, which is hinged at its bottom to the top of the lower seat back frame for folding down onto the seat bottom frame, means supporting the inboard side of the base on the floor comprising an inboard leg assembly 9 which is pivoted to the inboard side of the main base frame, and an outboard leg assembly 10 which is pivoted to the outboard side of the main base frame and to the vehicle floor.

In addition to the foregoing main frame structure, most of which is best made of lightweight metal tubing as best shown in Fig. 2, the complete construction includes bottom and back cushions, side paneling, armrest elements, floor hinges and fastenings, upper side wall fastenings, actuators for sliding the seat bottom frames and securing them in adjusted position on the main base frame, and various connections and fastening means, all of which will be referred to and explained in the description hereinafter.

The main base frame 5 comprises a lower front cross member 12 and a lower rear cross member 13, which are parallel and are horizontal in the operative position of the seat shown in Fig. 2, which will be used as the basic figure for designating the horizontal and vertical. The ends of these cross members are turned right-angularly up to form vertical front side posts 14 and vertical rear side posts 15, and to the centers of the respective cross members there are welded a relatively low vertical front center post 16 and a vertical rear center post 17, the latter being substantially as high as the side posts 14 and 15. Each post 14 is connected with the post 16 by an upper front cross member 18, and each post 15 is connected with the post 17 by an upper rear cross member 19. In substantially the horizontally plane of these upper cross members the posts 14 and 15 are connected at the inboard side by an inboard lower side member 20 and at the outboard side by an outboard lower side member 21, and the posts 16 and 17 are similarly connected by a center fore and aft or longitudinal member 22. Additional lower side members 20a and 21a may be used to connect the lower front and rear cross members 12 and 13 at the outboard and inboard sides, respectively, of the frame. The members 20, 21 and 22 may be gusseted to the rear posts 15 and 17, respectively, as shown, to enhance the rigidity of the main base frame.

The posts 14 and 15 at each side of the structure are connected by an upper side member 23 which may have a flat upper horizontal surface, in order to function as an armrest support, and is thus best made of angle or T-shaped stock. Short struts 24 connect the lower and upper front cross members 12 and 18, and the lower and upper rear cross members 13 and 19, to cooperate with the gussets and other connections, which are preferably all welded, to make the main base frame highly rigid and strong despite its light weight and the open or skeleton character of its construction.

It will be noted that the main base frame 5 is symmetrical from side to side so that it can be positioned interchangeably on either side of the aisle 4, with either of its sides adjacent to the side wall 2. As will be seen hereinafter, the main base frame supporting means, including the leg structure which is a principal part of the present invention, is interchangeable at the two sides of the main base frame. In this way the making of special right and left main base frames is avoided, and manufacture, maintenance and replacement are all simplified, with considerable resulting economy.

Each seat bottom frame 6, two of which are set side by side on the single main base frame 5 in the illustrated twin seat embodiment of the invention, comprises a generally rectangular frame made of tubular metal stock which is mounted for limited sliding movement longitudinally of the main base frame by fittings 25. The adjusted position of each seat bottom frame 6 fore and aft on the main base frame 5 is controlled by latching means generally designated 26, which includes an actuating handle 27 accessible at the front of the structure, as appears in Figs. 1, 6 and 7.

The rear end of each seat bottom frame 6 is pivoted at 28 to the bottom of the lower seat back frame 7, so that when the seat bottom frame slides fore and aft the lower seat back frame will swing about the pivots 29 which hinge its top ends to the posts 15 and 17.

Each upper seat back frame 8 is hinged also at its bottom ends to the pivots 29 and is normally held rigid with its lower seat back frame by catches 30, so that the entire back normally swings as a unit in response to sliding movement of its seat bottom frame. However, the catches 30 are releasable, as by an actuator 31 accessible from the rear of the back, so that the upper seat back frame can be swung down into substantial parallelism with its seat bottom frame for folding the seat into a compact low unit. Fig. 2 shows at the right hand side the outboard upper seat back frame being folded down, and Figs. 3 and 4 illustrate both upper backs of the twin seat structure in completely downfolded position.

The seat bottom frames are appropriately cushioned and upholstered, as shown at 32, and the lower and upper seat back frames are similarly treated, as shown at 33 and 34, respectively.

A center armrest 35 is rigidly fixed on the posts 16 and 17, and side armrests 36 are hinged to the upper side members 23. All of the armrests are appropriately upholstered or otherwise trimmed and each may be provided at its front with a sliding ashtray 37.

Trim paneling 38 may be provided to enclose and dress the space between the posts 14 and 15 and the upper side member 23 and lower side member 21a at the inboard side of the seat. The corresponding space at the outboard end of the seat is left open and untrimmed beneath the outboard armrest 36 for a purpose hereinafter to be explained.

It will be evident from the foregoing that each of the seats is foldable from its open, operative, occupant-supporting position shown in Fig. 1 to the position shown in Fig. 3, in which each back is collapsed down on the cushion of its seat bottom frame, and that the backs may be clamped in such position by swinging the hinged inboard and outboard armrests down over the side margins of the backs. The armrests can be maintained in such clamping position by leaf springs 39 hinged to the upper side members 23 and adapted to snap into and out of engagement with appropriate keepers formed under the armrests 36.

The primary object of the invention is to provide simple and practical means for mounting the seat at a minimum spacing from the side wall 2 and for stowing the folded seat, in the condition shown in Fig. 3, more or less vertically upright against the side wall 2 with a minimum of spacing between the seat and side wall and with the bottom of the seat at a minimum elevation above the floor 1.

This is accomplished by the novel leg structure which forms an important part of the present invention. The outboard leg, generally designated 10, comprises front and rear upright portions 41 connected near their upper ends by a lengthwise cross member 42 on which the main base frame 5 normally bears when the seat is in operative horizontal position. From the top of each of the upright portions 41 an upper leg portion 43 extends outwardly at an angle, being in the illustrated preferred embodiment somewhat curved to correspond to the curvature by which the main base frame cross members 12 and 13 merge into the vertical side posts 14 and 15. The upper end of the upper leg portion 43 is pivoted at 44 to the main base frame, preferably near the bottom of each of the posts 14 and 15, or along the curvature where these posts merge with the cross members 12 and 13.

The front and rear outboard leg portions 41 may be stiffened and united into a rigid leg assembly with the cross member 42 by diagonal bracing struts 40, as shown in Figs. 2 and 7.

The bottom of each upright portion 41 of the leg 10 is pivoted at 45 to a floor hinge means 46, conveniently made in the form of a U-shaped bracket which is fastened to the floor 1 very close to the side wall 2, as best shown in Figs. 3, 4 and 5.

The inboard side of the main base frame is supported on the floor by means which may be a leg structure 9 generally quite similar to the outboard leg 10. Thus, the inboard leg structure may include a lower normally upright portion 48 having at its top a lengthwise cross member 49 normally providing a bearing for the main base frame 5, with an upper leg portion 50 curved upwardly in a generally inboard direction, having its upper portion pivoted at 51 to the main base frame 5 at the same height and relative location thereon as the pivot 44 at which the outboard leg 10 is connected to the main base frame.

Diagonal bracing struts 47, like the elements 40 of the outboard leg assembly, may be used to connect and stiffen each inboard leg portion 48 with the cross member 49, as shown in Fig. 6.

The bottom of the inboard leg 9 is not hinged or pivoted to the floor, as is the bottom of the outboard leg 10, but is connected to the floor by a quick releasing attachment means 52, such as a "Wedjit" connector. These fastenings are made and sold by Monadnock Mills, of Los Angeles, California, and comprise a plate 52 which is permanently secured to the floor and has a hole into which a foot or stud 53 extending axially from the bottom of the leg portion 48 is insertible. The stud is of smaller diameter than the leg portion 48 and rather snugly fits the hole so that the leg portion is well supported on the hole margins. Attachment is effected by a pair of spring loaded jaws mounted on the under side of the plate which snap into an annular groove formed in the stud, and release is effected by rotating an actuator element 52a carried by the plate and operative to cam the jaws apart. Of course any other kind of quick release attachment means can be used. The arrangement is such that the inboard leg can be securely fastened in upright, seat base frame supporting position automatically on insertion of the studs 53 into the two floor plates, and can be readily detached and disconnected.

While it is not necessary, in moving the seat from horizontal operative position to vertical stowed position, to disconnect the outboard leg 10 from the floor, it is desirable to make the attachment of the outboard leg to the floor a releasable one so that the entire installation can be readily removed bodily from the vehicle. To accomplish this object it is convenient to provide the bottom of the floor hinge means bracket 46 with a foot or stud like the foot or stud 53 for mounting in a plate like the plate 52.

With the base frame thus mounted in operative position by the inboard and outboard legs or other supporting means just described, the structure is swung to upright, stowed position in the following way:

The inboard leg assembly 9 is disconnected from the two plates 52 and the entire seat structure is pulled in an inboard direction. This lowers the outboard side of the seat as the outboard leg 10 swings down about the floor hinge 46 and the main base frame 5 swings about the pivot 44. The structure is then in the position shown in Fig. 4, with its outboard side lowered very nearly to the floor 1 and spaced an increased distance from the side wall 2. The inboard side of the seat is then lifted and the seat is swung upwardly about the pivot 44 to assume the position shown in Fig. 5, in which it fits snugly against the side wall 2. The inboard leg 9 is then swung about the pivot 51 so as to engage the side wall 2, where the two feet or studs 53 of this leg can engage and be secured by a pair of plates 54 fastened to the upper portion of the side wall and formed and operating exactly like the plates 52.

The seat structure is thus in securely mounted stowed position with what was formerly its outboard side lowered into close juxtaposition to the floor 1. Thus a minimum of clearance is required above the stowed seat, so that the seat may be stowed beneath luggage racks and other upper side wall fixtures. Moreover, the lowered position of the stowed seat provides maximum protection to the side wall. The untrimmed outboard leg means provides access to the lengthwise cross member 42 for the reception of cargo anchorage straps and the like.

To restore the structure to the operative position shown in Fig. 1, it is necessary merely to disconnect the inboard leg from the upper side wall plates 54, swing the seat down about the pivot 44, then lift the seat and outboard leg 10 about the pivot 45, and finally swing the inboard leg 9 down and connect it with the floor plates 52, followed by lifting the armrests 36 and the upper back cushion 34.

In the horizontal, operative position the seat is supported with great stability by the two leg assemblies and cannot rock toward or from the side wall notwithstanding the lack of linkage or other connection of the seat to the side wall. An important factor in achieving this stability, it will be observed, is the use of supporting means carried by the legs to provide direct bearing for the main base frame. In the illustrated embodiment this supporting means comprises the cross members 42 and 49 which connect and hence incidentally also stiffen the leg portions 41, 41 and 48, 48, respectively. Bearing on these members, the main base frame cannot swing to either side, since the member 42 prevents outboard swinging and the member 49 prevents inboard swinging, as will be apparent from a consideration of Fig. 3. It is to be noted that if the stiffening function be thought unnecessary, the required bearing support can be attained by extending each member 42 and 49 less than the full length between the leg portions 41, 41 and 48, 48, respectively, i. e., by reducing them to mere lugs or equivalent abutments or stops for the members 12 and 13 of the main base frame.

Other changes within the spirit of the invention and

We claim:

1. In combination with the floor and side wall of a vehicle interior, a seat comprising a seat base positioned horizontally with its outboard side adjacent to said wall, means normally supporting the inboard side of the base on the floor, an outboard leg normally supporting the outboard side of the base on the floor and cooperating with said means to maintain the base in horizontal position, said outboard leg comprising a lower normally upright portion and an upper portion extending angularly therefrom in a generally outboard direction, seat base hinge means pivoting the upper end of the upper portion of the outboard leg to the outboard side of the seat base, floor hinge means pivoting the lower portion of said leg to the floor adjacent to the wall, whereby said leg may be swung inwardly about the floor hinge means to lower the outboard side of the base toward the floor but spaced above it by the upper portion of the leg and whereby the base may then be swung about said seat base hinge means to upright position against said wall, and means adapted to secure the base in said upright position.

2. The combination claimed in claim 1, in which the means supporting the inboard side of the base on the floor is an inboard leg which has its lower end detachably secured to the floor.

3. The combination claimed in claim 1, in which the means supporting the inboard side of the base on the floor is an inboard leg which has its lower end detachably secured to the floor and its upper end portion hinged to the inboard side of the base for swinging movement toward the wall when the base is in upright position to cooperate with the means adapted to secure the base in said position against the wall.

4. The combination claimed in claim 1, in which the means supporting the inboard side of the base on the floor is an inboard leg which has its lower end provided with a foot portion detachably secured in a socket formed in the floor and has its upper end portion hinged to the inboard end of the base for swinging movement toward the wall when the base is in upright position to enter and be secured in a socket formed in the wall to secure the base in said position against the wall.

5. In combination with the floor and side wall of a vehicle interior, a seat comprising a seat base positioned horizontally with its outboard side adjacent to said wall, means supporting the inboard side of the base on the floor comprising a leg having its bottom resting on the floor and its upper end portion pivoted to the inboard side of the base and an intermediate abutment providing a bearing for the base, means supporting the outboard side of the base on the floor consisting solely of outboard leg means having a lower normally upright portion with its bottom pivoted to the floor and having an upper portion rigid with and extending angularly from the top of the lower portion in a generally outboard direction with the top of the upper portion pivoted to the outboard side of the base, an intermediate abutment providing a bearing for the base, and means adapted to secure the base in upright position against the wall after the outboard side of the base has been lowered toward the floor by swinging the outboard leg means down about the pivotal connection of said leg to the floor followed by swinging the base up about the pivotal connection of said leg to the base.

6. The combination claimed in claim 5, in which the inboard leg has its bottom detachably secured to the floor.

7. The combination claimed in claim 5, in which the inboard leg has its bottom detachably secured to the floor and in which the wall is provided with means adapted to secure said leg after the base has been swung up and said leg has been swung up about its pivotal connection to the base.

8. In combination with the floor and side wall of a vehicle interior, a seat comprising a seat base positioned horizontally with its outboard side adjacent to said wall, inboard leg means having an upper portion pivotally connected to the inboard side of the base and having a lower portion separably connected to the floor for normally supporting the inboard side of the base on the floor, an outboard leg normally supporting the outboard side of the base on the floor and cooperating with said inboard leg means to maintain the base in horizontal position, said outboard leg comprising a lower normally upright portion and an upper portion extending angularly therefrom in a generally outboard direction, seat base hinge means pivoting the upper end of the upper portion of the outboard leg to the outboard side of the seat base, floor hinge means pivoting the lower portion of said leg to the floor adjacent to the wall, whereby, when said inboard leg means is disconnected from the floor, said outboard leg may be swung inwardly about the floor hinge means to lower the outboard side of the base toward the floor but spaced above it by the upper portion of the leg and whereby the base may then be swung about said seat base hinge means to upright position against said wall, and means adapted, when the base is in said upright position, to secure the inboard leg means to the upper portion of the wall.

9. In combination with the floor and side wall of a vehicle interior, a seat comprising a seat base positioned horizontally with its outboard side adjacent to said wall and having front and rear transverse cross members, inboard leg means normally supporting the inboard side of the base on the floor, an outboard leg structure normally supporting the outboard side of the base on the floor and cooperating with said inboard leg means to maintain the base normally in an operative horizontal position, said outboard leg structure comprising a normally upright front leg and a normally upright rear leg and rigid bracing structure connecting the upper portions of said legs to stiffen the leg structure and provide upper surface areas for abutment by said front and rear transverse cross members of the seat base, a portion of each of said legs of the outboard leg structure extending angularly in a generally outboard direction from its connection with said bracing structure, seat base hinge means pivoting the free end of said extended portion of each leg to the seat base adjacent to the outboard side thereof, floor hinge means pivoting the lower portion of each outboard leg to the floor whereby said leg structure may be swung inwardly about the floor hinge means to lower the outboard side of the base toward the floor so that the base may then be swung about said seat base hinge means to upright position against said wall, and means for connecting the inboard leg means to the wall to secure the base in said upright position.

References Cited in the file of this patent

UNITED STATES PATENTS

| | | |
|---|---|---|
| 1,593,477 | Speyer | July 20, 1926 |
| 1,876,327 | Lauterstein | Sept. 6, 1932 |
| 2,152,505 | Stuart et al. | Mar. 28, 1939 |
| 2,216,243 | Kreidler | Oct. 1, 1940 |
| 2,523,960 | Liljengren et al. | Sept. 26, 1950 |